United States Patent [19]

Mizoguchi

[11] Patent Number: 5,173,925
[45] Date of Patent: Dec. 22, 1992

[54] DEMODULATING SYSTEM CAPABLE OF ACCURATELY EQUALIZING RECEIVED SIGNALS USING ERROR CORRECTION CODES

[75] Inventor: Shoichi Mizoguchi, Tokyo, Japan

[73] Assignee: NEC Corporation, Tokyo, Japan

[21] Appl. No.: 665,130

[22] Filed: Mar. 6, 1991

[30] Foreign Application Priority Data

Mar. 6, 1990 [JP] Japan ................................. 2-52820

[51] Int. Cl.$^5$ .............................................. H04B 3/04
[52] U.S. Cl. .......................................... 375/14; 371/41
[58] Field of Search ................... 371/30, 37.1, 41, 43; 375/11, 12, 14; 333/18

[56] References Cited

U.S. PATENT DOCUMENTS

| | | | |
|---|---|---|---|
| 3,721,959 | 3/1973 | George | 371/5.1 |
| 3,983,499 | 9/1976 | Tan | 329/307 |
| 4,121,166 | 10/1978 | Matsumoto et al. | 329/307 |
| 4,928,287 | 5/1990 | Tanaka | 375/14 |
| 5,052,000 | 9/1991 | Wang et al. | 375/14 |

FOREIGN PATENT DOCUMENTS 55-34619 8/1980 Japan .

OTHER PUBLICATIONS

Vol. II of Elements of Digital Satellite Communication written by William W. Wu and published (1985) by the Computer Science Press, pp. 279-299.

Primary Examiner—Benedict V. Safourek
Attorney, Agent, or Firm—Sughrue, Mion, Zinn, Macpeak & Seas

[57] ABSTRACT

In a demodulating system for demodulating a modulated signal into decoded signals (S11'-12', S21'-22'), an error signal correcting circuit (55) is used in correcting discrimination error signals (Ep, Eq) supplied from a demodulator (52) in compliance with error location signals (Sp1-2, Sq1-2) supplied from an error-correcting decoder (54) and in producing corrected discrimination error signals (Ep', Eq') for supply to an adaptive equalizer (51) which is additionally supplied with polarity signals (Dp, Dq) from a delay circuit (53). The modulated signal is equalized in accordance with the corrected discrimination error signals and the polarity signals, demodulated into demodulated signals and the discrimination error signals, and error corrected and decoded into the decoded signals. The delay circuit delays P-channel and Q-channel polarity bits of the demodulated signal into the polarity signals. The error-correcting decoder produces the error location signals by using P-channel and Q-channel error correcting code bits of the demodulated signals. The modulated signal may be supplied first to the demodulator and then to the equalizer.

4 Claims, 5 Drawing Sheets

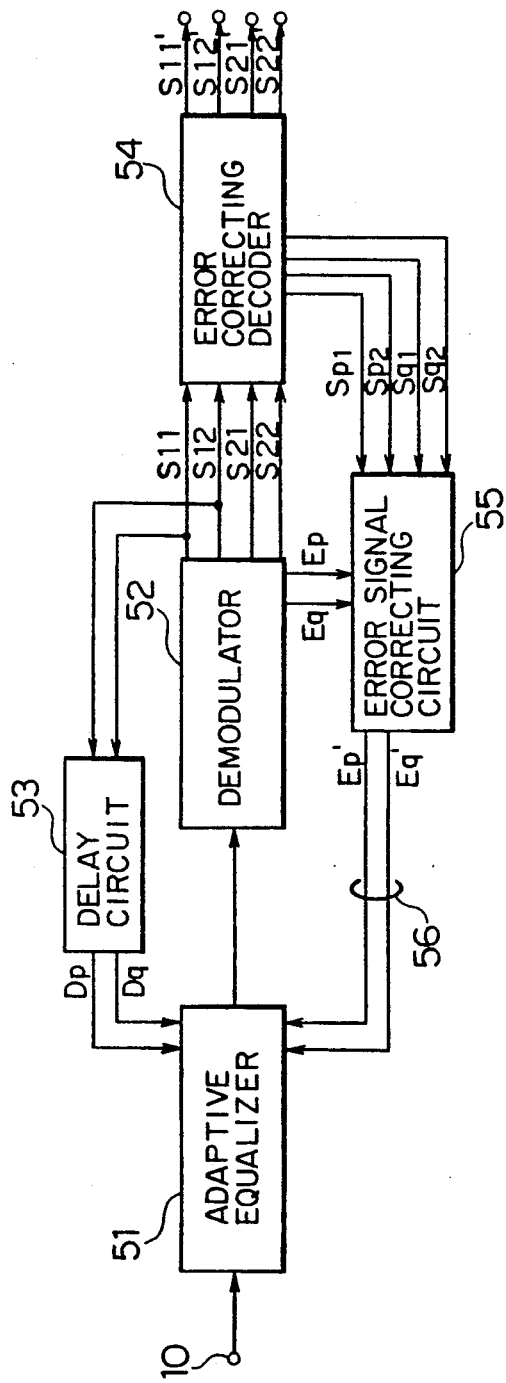
F I G. 5
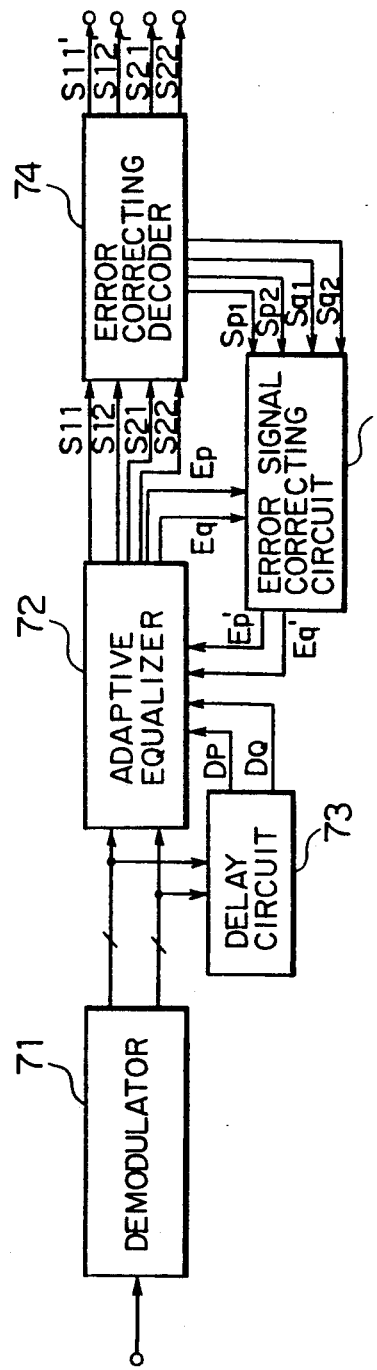
F I G. 7

DEMODULATING SYSTEM CAPABLE OF ACCURATELY EQUALIZING RECEIVED SIGNALS USING ERROR CORRECTION CODES

BACKGROUND OF THE INVENTION

This invention relates to a demodulating system for demodulating a modulated signal produced by modulating a carrier signal by error correcting coded transmission data.

A conventional demodulating system comprises an adaptive equalizer for adaptively equalizing the modulated signal into an equalized signal in accordance with polarity signals and discrimination error signals. A demodulator demodulates the equalized signal into demodulated signals and the discrimination error signals. The demodulated signals comprise polarity bits and other data bits. Supplying lines supply the polarity bits to the adaptive equalizer as the polarity signals. An error-correcting decoder is supplied with the demodulated signal and produces error location signals representative of location of error in the demodulated signals, and corrects error in the demodulated signals by using the error location signals into decoded signals.

As will later be described more in detail, the conventional demodulating system is defective in that the adaptive equalizer can not remove distortion which appears in a propagation path because the discrimination error signals have a wrong value under the influence of big thermal noise which is inevitably superposed on the demodulated signal while propagated through the propagation path to the demodulating system.

SUMMARY OF THE INVENTION

It is therefore an object of the present invention to provide a demodulating system capable of correcting discrimination error signals and can remove distortion which appears in a propagation path.

On describing the gist of an aspect of this invention, it is possible to understand that a demodulating system is for demodulating a modulated signal produced by modulating a carrier signal by error correction coded transmission data and includes: (a) adaptive equalizing means for adaptively equalizing the modulated signal into an equalized signal in accordance with polarity signals and corrected discrimination error signals; (b) demodulating means for demodulating the equalized signal into demodulated signals and discrimination error signals, the demodulated signals being reproduced data bits of said correction coded transmission data and comprising polarity bits and other data bits; (c) polarity signal supplying means for supplying the polarity bits to the adaptive equalizing means as the polarity signals; (d) error-correction code decoding means for producing error location signals representative of location of errors in said demodulated signals and for error correcting and decoding the demodulated signals by using the error location signals; and (e) error signal correcting means connected to the demodulating means and the error-correction code decoding means for correcting the discrimination error signals into said corrected discrimination error signals in accordance with the error location signals.

On describing a different aspect of this invention, it is possible to understand that a demodulating system is for demodulating a modulated signal produced by modulating a carrier signal by error correction coded transmission data and includes: (a) demodulating means for demodulating the modulated signal into demodulated signals comprising data bits representative of the error correction coded transmission data containing polarity bits representative of polarities of the demodulated signals; (b) adaptive equalizing means for adaptively equalizing the demodulated signals in accordance with polarity signals and corrected discrimination error signals to output equalized signals and discrimination error signals; (c) polarity signal supplying means for supplying the polarity bits to the adaptive equalizing means as the polarity signals; (d) error correction code decoding means for producing error location signals representative of location of errors in said equalized signals and for error correcting and decoding the equalized signals by using the error location signals into decoded signals; and (e) error signal correcting means connected to the adaptive equalizing means and the error-correction code decoding means for correcting the discrimination error signals into corrected discrimination error signals in accordance with the error location signals.

BRIEF DESCRIPTION OF THE DRAWING

FIG. 5 is a block diagram of a demodulating system according to a first embodiment of this invention;

FIG. 7 is a block diagram of a demodulating system according to a second embodiment of this invention.

DESCRIPTION OF THE PREFERRED EMBODIMENT

Figure 1:
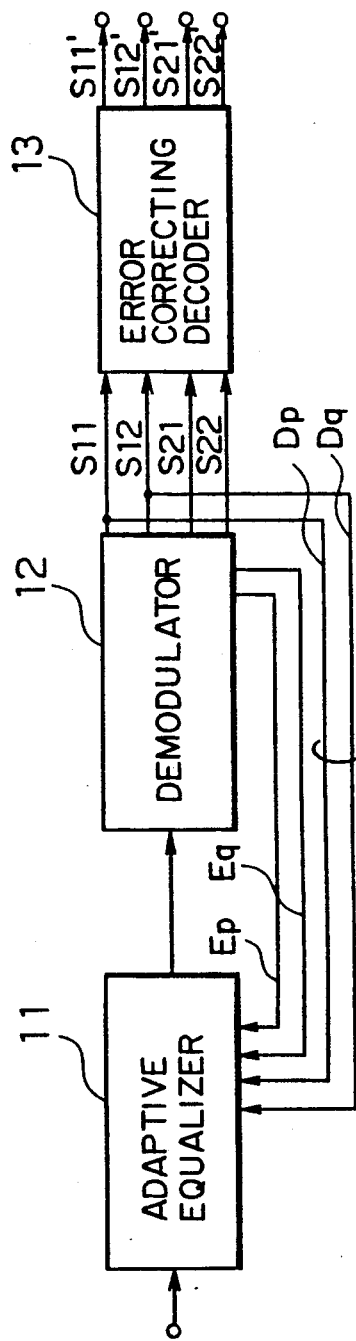
FIG. 1 is a block diagram of a conventional demodulating system.
Figure 2:
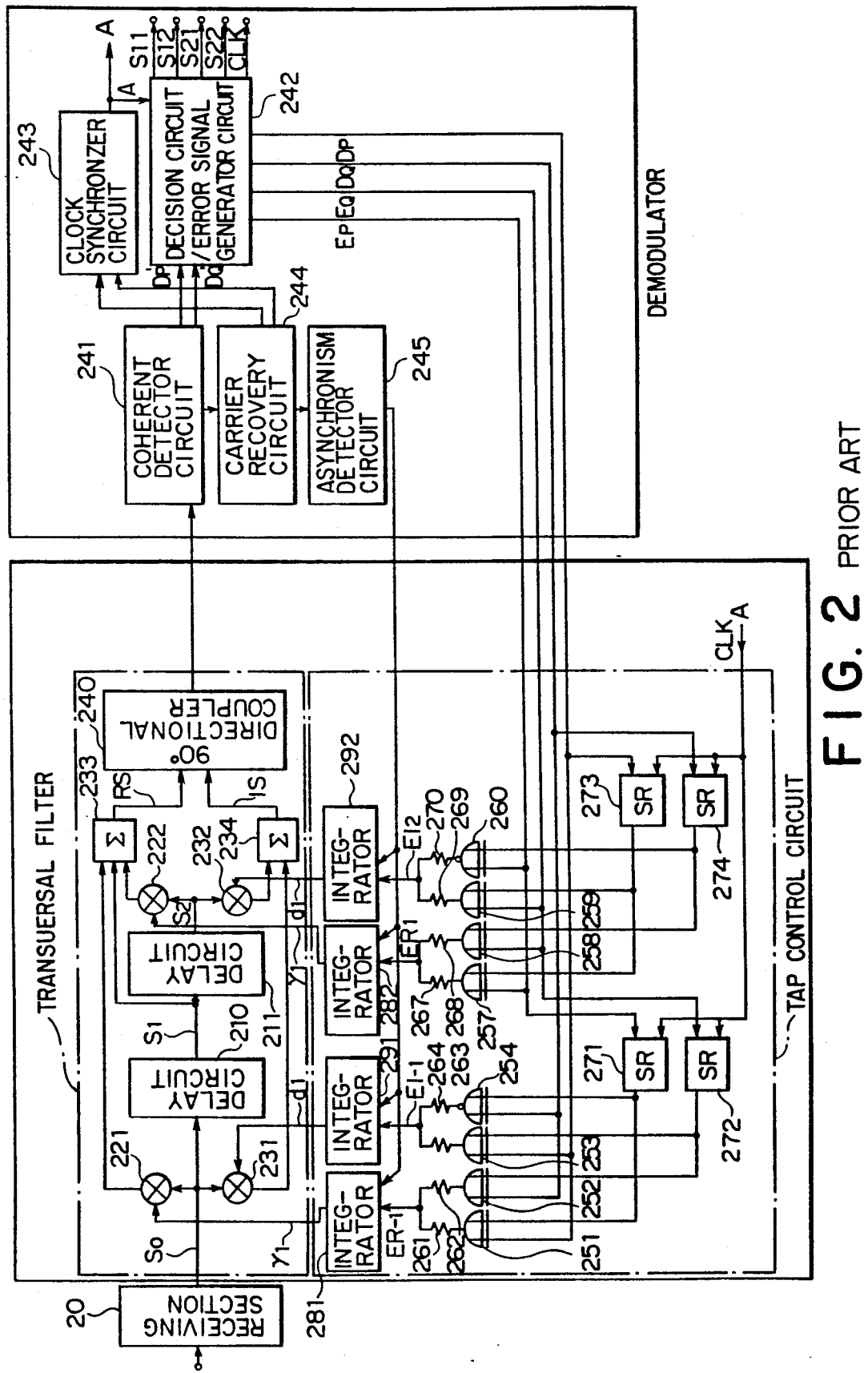
FIG. 2 is a block diagram of an adaptive equalizer used in the demodulating system depicted in FIG. 1.
Figure 3:
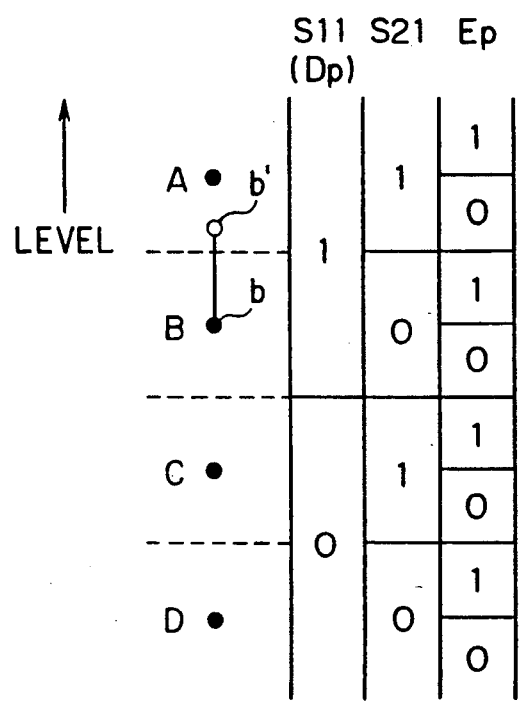
FIG. 3 is a diagram for use in describing operation of the demodulating system illustrated in FIG. 1.

Referring to FIGS. 1, 2, and 3, a conventional demodulating system will be described at first in order to facilitate an understanding of the present invention.

The demodulating system is for demodulating a modulated signal produced by QAM modulating a carrier signal by a sequence of error correcting coded transmission data. For example, the error correcting codes are given by Bose-Chaudhuri-Hocquenghem (BCH) codes or Lee codes.

In FIG. 1, the demodulating system comprises an adaptive equalizer 11 which is supplied with the modulated signal and is for adaptively equalizing the modulated signal into an equalized signal in accordance with polarity signals Dp and Dq and discrimination error signals Ep and Eq. A demodulator 12 demodulates the equalized signal into demodulated signal S11, S12, S21, and S22 and the discrimination error signals Ep and Eq -supplied back to the adaptive equalizer 11.

The demodulated signals S11, S12, S21, and S22 are supplied to an error-correcting decoder 13. Supplying lines 14 supply the polarity bits S11 and S12 to the adaptive equalizer 11 as the polarity signals Dp and Dq.

The error-correcting decoder 13 produces error location signals representative of location of errors in the demodulated signals. The error-correcting decoder 13 correct errors in the demodulated signals by using the error location signals into decoded signals S11′, S12′, S21′, and S22′.

Turning to FIG. 2, the adaptive equalizer 11 is a three tapped equalizer with an IF band transversal filter supplied with sixteen QAM waves as its input modulated carrier signal. The description hereunder generally applies to any value of L (L=m$^2$, m being an integer not smaller than 2) and to an N-tapped (N being a positive integer and independent of L and m) equalizer with an IF band transversal filter.

A radio signal is picked by an antenna (not shown) and fed to a receiving section 20. Produced from the receiving section 20, an IF signal S0 is delayed by a first delay circuit 210 to provide a first delayed signal S1 and subsequently further delayed by a second delay circuit 211 into a second delayed signal S2. The IF signal S0 is branched and then multiplied in variable tap gain circuits 221 and 231 by control signals $\gamma_{-1}$ and $d_{-1}$ supplied from integrator circuits 281 and 291 having a resetting function. control signals $\gamma_1$ and $d_1$ delivered from integrator circuits 282 and 292 having a resetting function. The first delayed signal S1 and output signals of the variable tap gain circuits 221 and 222 are summed by a signal summing circuit 233 into a sum signal RS. On the other hand, output signals of the variable tap gain circuits 231 and 232 are synthesized by a signal summing circuit 234 into a synthesized signal IS. The signals RS and IS are combined by a 90°-directional coupler 240 into a composite signal so that their phases are in a quadrature relation to each other. The composite signal is then provided to a coherent detector circuit 241 supplied with a recovered carrier from a carrier recovery circuit 244. The coherent detector circuit 241 detects the input modulated carrier signal thereby to generate two trains of baseband signals $D_P'$ and $D_Q'$. Many methods for carrier recovery are known in the art, such as the baseband processing technique disclosed in U.S. Pat. No. 3,983,499.

As asynchronism detector circuit 245 is for detecting asynchronism in a carrier recovery loop. Such circuits are disclosed in, among others, Japanese Patent Publication No. 55-34619 and U.S. Pat. No. 4,121,166. Another method of asynchronism detection is monitoring the bit error rate and, when it surpasses a prescribed level, imposing initial level resetting, in the manner revealed in U.S. Pat. No. 3,721,959.

A decision/error signal generator circuit (analog to digital converter) 242 monitors the two trains of polarity signals $D_P$ and $D_Q$ and, by detecting the deviation between the baseband signals $D_P'$ and $D_Q'$ and any one of four preset levels, supplies discrimination error signals $E_P$ and $E_Q$ in order to control the tap gain circuits 221, 222, 231, and 232. The ZF (zero forcing) algorithm corrects each tap coefficients $C_{jk}$ of the tap gain circuits 221, 222, 231, and 232 by the use of these discrimination error signals $E_P$ and $E_Q$ in accordance with the steepest possible descent method to minimize the cusp or peak levels of waveform distortions. The ZF algorithm is carried out, for example, by using the following equations, in which all variables are given in (two-dimensional) complex numbers except for $\Delta$.

$$C_{j(k+1)} = C_{jk} - \Delta \cdot sgn \sum_{k=1}^{K} D^*_{(k-j)} Y_k, \quad (1)$$

$$C_{jk} = \gamma_{jk} + id_{jk}, \quad (2)$$

$$E_k = E_{pk} + iE_{Qk}, \quad (3)$$

$$\text{and } D^*_{(k-j)} = D_{P(k-j)} - iD_{Q(k-j)}, \quad (4)$$

where:
j is the tap number,
k is the time,
$\Delta$ is a fixed incremental step size of the tap setting,
$D^*_{(k-j)}$ is the complex conjugate of $D_{(k-j)}$, and sgn represents the polarity.

When the real and imaginary number parts are rearranged supposing that K is equal to 1 in the manner usual in actual circuits, the following equations hold:

$$\gamma_{j(k+1)} = \gamma_{jk} - \Delta \cdot sgn(E_{Pk}D_{P(k-j)} + E_{Qk}D_{Q(k-j)}) \quad (5)$$

$$d_{j(k+1)} = d_{jk} - \Delta \cdot sgn(E_{Qk}D_{P(k-j)} - E_{Pk}D_{Q(k-j)}), \quad (6)$$

where the ZF algorithm is used, all the variables in these equations are binary numbers and can be readily subjected to logical operation by a digital circuit. Products and sums are calculated by exclusive OR circuits (EORs) 251-253 and 257-259, exclusive NOR circuits (ENORs) 254 and 260, and resistors 261-264 and 267-270. The successive correction of taps in Equations (5) and (6) can be readily realized by the use of the integrators 281, 282, 291, and 292 having a resetting function as time-averaging circuits. Supposing here, with a view to explaining the control signals of FIG. 1, that j=1 (tap 1) and that the time k is a fixed time, namely, k=0, thereby omitting k, the second term of the right side of Equations (5) and (6) are transformed into:

$$\Delta \cdot \{E_P D_{P(-1)} + E_Q D_{Q(-1)}\}, \quad (7)$$

$$\text{and } \Delta \cdot \{E_Q D_{P(-1)} + E_P D_{Q(-1)}\}. \quad (8)$$

The symbol sgn in Equations (5) and (6) becomes unnecessary under the condition that the binary variables are logic operated. Here $D_{P(-1)}$ and $D_{Q(-1)}$ can be readily derived in correspondence to signals which are "one bit" behind $D_P$ and $D_Q$. By the use of shift registers 273 and 274, the EORs 257-259, and the ENOR 260, multiplication can be carried out as above. In the case of j=1, and where $D_P$ and $D_Q$ can not be advanced by one bit, $E_P$ and $E_Q$ are delayed by one bit so that $D_P$ and $D_Q$ are in effect advanced one bit with respect to the discrimination error signals $E_P$ and $E_Q$. The above-described multiplication can be likewise achieved by shift registers 271 and 272, the EORs 251-253, and the ENOR 254. The equalizer correlates the discrimination error signals $E_P$ and $E_Q$ and the demodulated polarity signals $D_P$ and $D_Q$ by a relationship with respect to time, determines a time position of the occurrence of an intersymbol interference (waveform distortion), and eliminates this waveform distortion by controlling the variable tap gain circuits 221, 222, 231, and 232 at the corresponding tap. Inasmuch as waveform distortions include inphase and quadrature distortions, the variable tap gain circuits 221-222 and 231-232 are needed to obtain the sum signal RS and the synthesized signal IS which are combined by the use of the 90° coupler 240.

A clock pulse signal is supplied from a clock synchronizer circuit 243 to the decision/error signal generator circuit 242 and the shift registers 271-274 to generally synchronize the system.

Turning back to FIG. 1, the error correcting decoder 13 is supplied with the demodulated signals S11, S12, S21, and S22 produced by the decision circuit 242 described in conjunction with FIG. 2. The error correcting decoder is a BCH decoder which comprises error location detection circuits for producing the error location signals representative of location of error in each of the demodulated signals S11, S12, S21, and S22. The BCH decoder comprises an error correcting circuit for correcting errors in the demodulated signals S11, S12, S21, and S22 to produce corrected signals by using the error location signals and decodes the corrected signals into the decoded signals S11', S12', S21', and S22'.

Referring to FIG. 3, the four signal levels of the demodulated signals are indicated at A, B, C, and D. The four signal levels have two subsignal levels.

A signal b (shown by black circle) must be in level B. Supposing that the signal b is influenced by thermal noise, the signal b moves upwardly of FIG. 3 to become another signal b' indicated by a white circle. In this case, the error signal Ep must be kept at "1". The signal b' is located in level A. As a result, the error signal Ep has an erroneous value of "0".

Even in this event, the error correcting decoder 13 can correct errors of the demodulated signals S11 and S21. No circuitry is, however, used in correcting the error signal Ep, which is therefore supplied to the adaptive equalizer 11 without correction. As the adaptive equalizer 11 equalizes the modulated signal in accordance with erroneous discrimination error signals, the adaptive equalizer 11 can not equalize the modulated signal properly.

Figure 4:
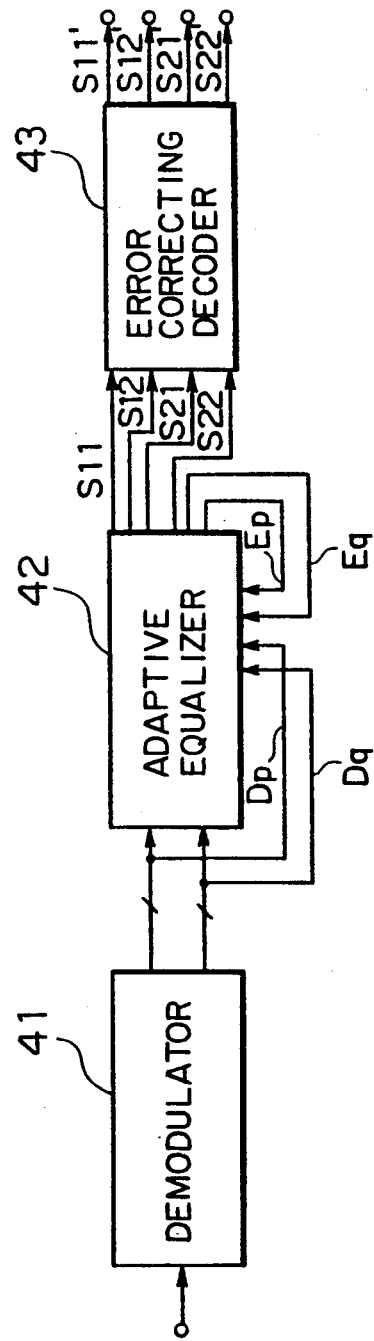
FIG. 4 is a block diagram of a different conventional demodulating system.

In FIG. 4, a different conventional demodulating system comprises a demodulator 41 which is supplied with a modulated signal and is for demodulating the modulated signal into demodulated signals. An adaptive equalizer 42 adaptively equalizes the demodulated signals in accordance with polarity signals Dp and Dq and error signals Ep and Eq, and outputs equalized signals S11, S12, S21, and S22 and error signals Ep and Eq. Supplying lines supply the polarity bits to the adaptive equalizer 42 as the polarity signals Dp and Dq. An error-correcting decoder 43 produces error location signals representative of location of errors in the equalized signals S11, S12, S21, and S22, and corrects the errors in the equalized signals into decoded signals S11', S12', S21', and S22'.

In the different conventional demodulating system, it is understood that the error signals sometimes are incorrect as in the first-mentioned conventional demodulating system. In this case, the adaptive equalizer 42 can not equalize the demodulated signal properly like the adaptive equalizer 11 described in conjunction with FIG. 1.

Referring to FIG. 5, the description will proceed to a demodulating system according to a first embodiment of this invention. The demodulating system is for demodulating a 16-QAM modulated signal produced by modulating a carrier signal by four sequences of error-correcting coded transmission data. The demodulating system includes an adaptive equalizer 51 which is supplied with the modulated signal and is for adaptively equalizing the modulated signal into an equalized signal in accordance with polarity signals Dp and Dq and corrected discrimination error signals Ep' and Eq'. A demodulator 52 demodulates the equalized signal into demodulated signals S11, S12, S21, and S22 and discrimination error signals Ep and Eq. A polarity signal supplying unit 53 supplies the polarity bits S11 and S12 to the adaptive equalizer 51 as the polarity signals Dp and Dq. An error-correcting decoder 54 produces error location signals Sp1, Sp2, Sq1, and Sq2 representative of locations of errors in the data bits S11, S12, S21, and S22. The error-correcting decoder 54 corrects the errors in the demodulated signals by using the error location signals Sp1, Sp2, Sq1, and Sq2 into decoded signals S11', S12', S21', and S22'. An error signal correcting circuit 55 is connected to the demodulator 52 and the error-correcting decoder 54 and corrects the discrimination error signals Ep and Eq into corrected discrimination error signals Ep' and Eq' in accordance with the error location signals Sp1, Sp2, Sq1, and Sq2. Corrected discrimination error signal supplying lines 56 are connected to the adaptive equalizer 51 and the error signal correcting decoder 54 and supplies the corrected discrimination error signals Ep' and Eq' to the adaptive equalizer 51.

Figure 6:
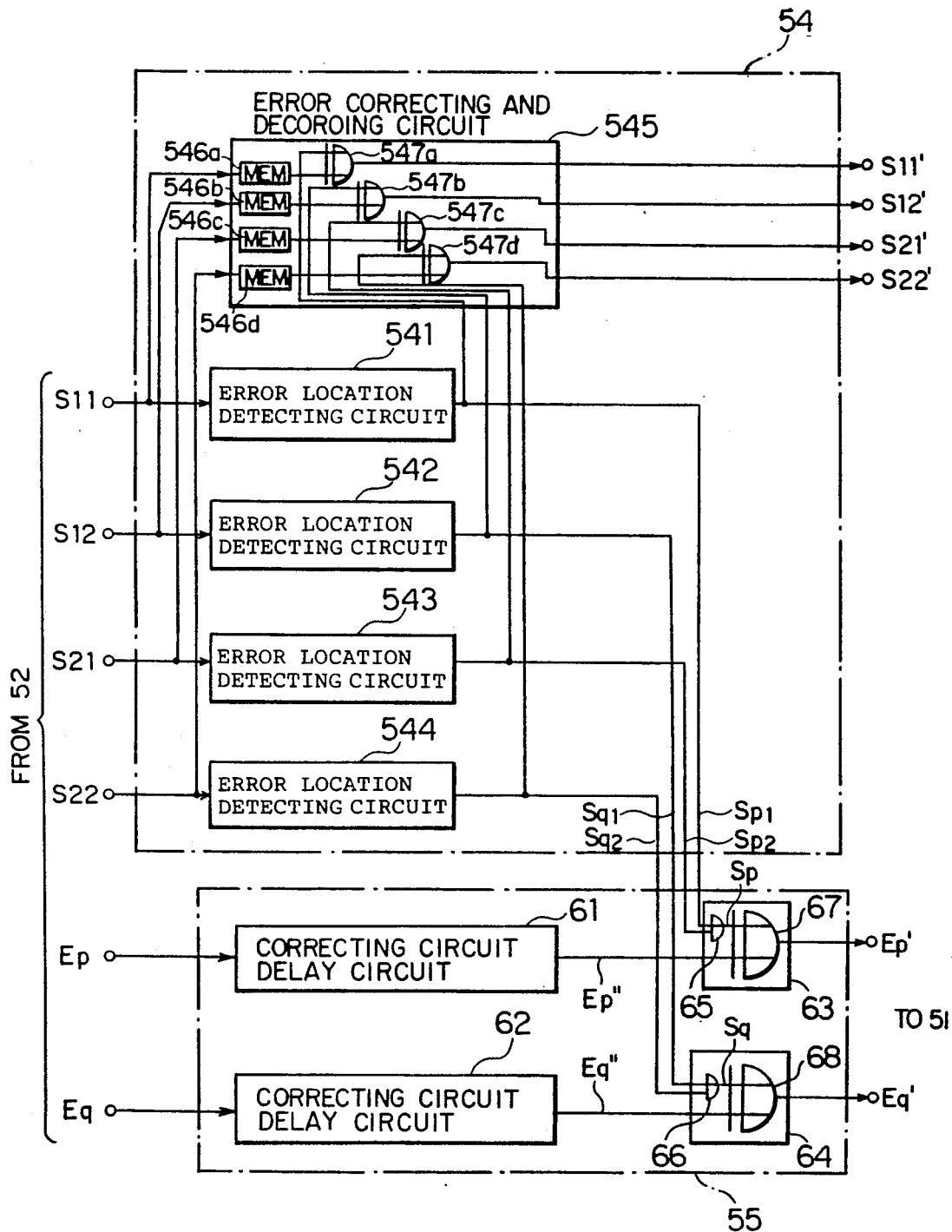
FIG. 6 is a block diagram of an error correcting decoder and an error signal correcting circuit used in the demodulating system depicted in FIG. 5.

Referring to FIG. 6, the error correcting decoder 54 and the error signal correcting circuit 55 will be described more specifically. The error correcting decoder 54 comprises error location detecting circuits 541, 542, 543, and 544 for detecting the locations of errors and producing the error location signals Sp1, Sp2, Sq1, and Sq2. Such circuits are described in Volume II of Elements of Digital Satellite Communication written by William W. Wu and published 1985 by the Computer Science Press, Rockville, Md. An error correcting and decoding circuit 545 includes elastic memories (MEM) 546a, 546b, 546c, and 546d and exclusive OR circuits (EORs) 547a, 547b, 547c, and 547d. The elastic memories 546a, 546b, 546c, and 546d are for giving the error-correcting coded data bits for a delay time between reception of the demodulated signals S11, S12, S21, and S22 from the demodulator 52 and reception of the error location signals Sp1, Sp2, Sq1, and Sq2 from the error location detecting circuits 541, 542, 543, and 544. The EORs 547a, 547b, 547c, and 547d correct errors and output the decoded signals.

The error signal correcting circuit 55 comprises correcting circuit delay circuits 61 and 62 for delaying the error signals Ep and Eq by the delay time. The correcting circuit delay circuits 61 and 62 thereby produce delayed signals Ep" and Eq". Producing circuits 67 and 68 include OR circuits 65 and 66 and exclusive OR circuits (EORs) 63 and 64. The OR circuit 65 is connected to the error location detecting circuits 541 and 542 and produces an error location signal Sp. The OR circuit 66 is connected to the error location detecting circuits 543 and 544 and produces another error location signal Sq. The EOR 63 is connected to the delay circuit 61 and the OR 65 and produces the corrected error discrimination signal Ep' in accordance with the delayed signal Ep" and the error location signal Sp. The EOR 64 is connected to the delay circuit 62 and the OR 66 and produces the corrected discrimination error signal Eq' in accordance with the delayed signal Eq" and the error location signal Sq. The polarity signal supplying unit 53 comprises a delay circuit for delaying S11 and S12 to output the polarity bits Dp and Dq by a common time interval which is equal to the delay time.

Referring to FIG. 7, the description will proceed to a different demodulating system according to a second embodiment of this invention.

The demodulating system is for demodulating a modulated signal produced by 16-QAM modulating a carrier signal by four sequences of error correction coded transmission data. The demodulating system includes a demodulator 71 for QAM demodulating the modulated signal into demodulated signals. An adaptive equalizer 72 adaptively equalizes the demodulated signal into equalized signals S11, S12, S21, and S22 and discrimination error signals Ep and Eq in accordance with polarity signals Dp and Dq and corrected discrimination error signals Ep' and Eq'. A polarity signal supplying unit 73 supplies the polarity bits of the demodulated signals to the adaptive equalizer 72 as the polarity signals Dp and Dq. An error correcting decoder 74 produces error location signals Sp1, Sp2, Sq1, and Sq2 by using the error correcting code bits of the equalized signals S11, S12, S21, and S22. The error correcting decoder 74 corrects errors in the equalized signals S11, S12, S21, and S22 and decodes the equalized signals S11, S12, S21, and S22 by using the error location signals into decoded signals S11', S12', S21', and S22'. The error location signals are representative of location of errors in the equalized signals S11, S12, S21, and S22.

An error signal correcting circuit 75 is connected to the adaptive equalizer 72 and the error correcting decoder 74. The error signal correcting circuit 75 corrects the error signals Ep and Eq into corrected discrimination error signals Ep' and Eq' in accordance with the error location signals.

The error signal correcting circuit 75 comprises correcting circuit delaying circuits in the manner described in connection with FIG. 6. The correcting circuit delay circuits are for delaying the error signals Ep and Eq by a delay time which is equal to a time interval between reception of the error signals Ep and Eq from the adaptive equalizer 72 and reception of the error location signals from the error correcting decoder 74. The correcting circuit delaying circuits thereby produce delayed signals. Like in FIG. 6, producing circuits are connected to the correcting circuit delay circuits and the error correcting decoder 54. The producing circuits produce the corrected discrimination error signals in accordance with the delayed signals and the error location signals.

The polarity signal supplying unit 73 comprises a delaying circuit for delaying the polarity bits in demodulated signals by a delay time interval which is equal to the delay time.

While this invention has thus far been described in conjunction with preferred embodiments thereof, it will readily be possible for those skilled in the art to put this invention into practice in various other manners. For example, this invention is applicable also to an automatic gain control (AGC) circuit, an automatic phase control (APC) circuit, and an interference compensation circuit.

What is claimed is:

1. A demodulating system for demodulating a modulated signal produced by modulating a carrier signal by error correction coded transmission data, said demodulating system including (a) adaptive equalizing means for adpatively equalizing said modulated signal into an equalized signal in accordance with polarity signals and corrrected discrimination error signals, (b) demodulating means for demodulating said equalized signal into demodulated signals and discrimination error signals, said demodulated signals being reproduced data bits of said correction coded transmission data and comprising polarity bits and other data bits, (c) polarity signal supplying means for supplying said polarity bits to said adaptive equalizing means as said polarity signals, (d) error-correction code decoding means for producing error location signals representative of locations of errors in said demodulated signals and for error correcting and decoding said demodulated signals by using said error location signals signals; and (e) error signal correcting means connected to said demodulating means, said error-correction code decoding means, and said adaptive equalizing means, for correcting said discrimination error signals into said corrected discrimination error signals in accordance with said error location signal and supplying said corrected discrimination error signals to said adaptive equalizing means.

2. The demodulating system as claimed in claim 1, wherein:
said error signal correcting means comprises:
first delaying means for delaying said discrimination error signals by a delay time between reception of said discrimination error signals from said demodulating means and reception of said error location signals from said error correction code decoding means, said first delaying means thereby producing delayed signals; and
producing means connected to said first delaying means and said error correction code decoding means for producing said corrected discrimination error signals in accordance with said delayed signals and said error location signals;
said polarity signal supplying means comprising second delaying means for delaying said polarity bits by a common time interval which is equal to said delay time.

3. A demodulating system for demodulating a modulated signal produced by modulating a carrier signal by error correction coded transmission data, said demodulating system including (a) demodulating means for demodulating said modulated signal into demodulated signals comprising data bits representative of said error correction coded transmission data containing polarity bits representative of polarities of said demodulated signals, (b) adaptive equalizing means for adaptively equalizing said demodulated signals in accordance with polarity signals and corrected discrimination error signals to output equalized signals and discrimination error signals, (c) polarity signal supplying means for supplying said polarity bits to said adaptive equalizing means as said polarity signals, (d) error correction code decoding means for producing error location signals representative of location of errors in said equalized signals and for error correcting and decoding said equalized signals by using said error location signals into decoded signals, and (e) error signal correcting means connected to said adaptive equalizing means and said error-correction code decoding means for correcting said discrimination error signals into corrected discrimination error signals in accordance with said error location signals and supplying said corrected discrimination error signals to said adaptive equalizing means.

4. The demodulating system as claimed in claim 3, wherein:
said error signal correcting means comprises:
first delaying means for delaying said discrimination error signals by a delay time between reception of said discrimination error signals from said adaptive equalizing means and reception and of said error location signals from said error correction code decoding means, said first delaying means thereby producing delayed signals; and
producing means connected to said delaying means and error correction code decoding means for producing said corrected discrimination error signals in accordance with said delayed signals and said error location signals; and
said polarity signal supplying means comprising second delaying means for delaying said polarity bits by a common time interval which is equal to said delay time.

* * * * *

UNITED STATES PATENT AND TRADEMARK OFFICE
CERTIFICATE OF CORRECTION

PATENT NO. : 5,173,925
DATED : Dec. 22, 1992
INVENTOR(S) : Shoichi Mizoguchi

It is certified that error appears in the above-identified patent and that said Letters Patent is hereby corrected as shown below:

Col. 3, line 20, after "function.", insert --The second delayed signal S2 is branched and multiplied in variable tap gain circuits 222 and 232 by -- which should begin a new paragraph.
    Col. 7, line 67, delete the second occurrence of "signals".

Signed and Sealed this

Twenty-sixth Day of October, 1993

Attest:

BRUCE LEHMAN

*Attesting Officer*      *Commissioner of Patents and Trademarks*